United States Patent
Jegorel et al.

(10) Patent No.: US 12,325,659 B2
(45) Date of Patent: Jun. 10, 2025

(54) GLASS-CERAMIC ARTICLE

(71) Applicant: EUROKERA S.N.C., Chateau Thierry (FR)

(72) Inventors: Théo Jegorel, Paris (FR); Erwann Luais, Chateau Thierry (FR)

(73) Assignee: EUROKERA S.N.C., Chateau Thierry (FR)

( * ) Notice: Subject to any disclaimer, the term of this patent is extended or adjusted under 35 U.S.C. 154(b) by 538 days.

(21) Appl. No.: 17/441,502

(22) PCT Filed: Mar. 19, 2020

(86) PCT No.: PCT/EP2020/057564
§ 371 (c)(1),
(2) Date: Sep. 21, 2021

(87) PCT Pub. No.: WO2020/193349
PCT Pub. Date: Oct. 1, 2020

(65) Prior Publication Data
US 2022/0162119 A1    May 26, 2022

(30) Foreign Application Priority Data
Mar. 22, 2019 (FR) .................................. 1903012

(51) Int. Cl.
*C03C 17/34* (2006.01)

(52) U.S. Cl.
CPC .... *C03C 17/3435* (2013.01); *C03C 2217/281* (2013.01); *C03C 2217/78* (2013.01); *C03C 2218/156* (2013.01)

(58) Field of Classification Search
None
See application file for complete search history.

(56) References Cited

U.S. PATENT DOCUMENTS

| 5,070,045 A | 12/1991 | Comte et al. |
| 5,594,231 A | 1/1997 | Pellicori et al. |
| 2007/0056961 A1 | 3/2007 | Shimatani et al. |
| 2014/0376094 A1 | 12/2014 | Bellman et al. |
| 2015/0284840 A1 | 10/2015 | Henn et al. |
| 2016/0264455 A1* | 9/2016 | Weber ..................... C03C 17/04 |
| 2019/0337843 A1* | 11/2019 | Morin ................. C03C 17/3681 |

FOREIGN PATENT DOCUMENTS

| EP | 0 437 228 A1 | 7/1991 |
| FR | 2 657 079 A1 | 7/1991 |
| WO | WO 2008/053110 A2 | 5/2008 |
| WO | WO 2012/156444 A1 | 11/2012 |

OTHER PUBLICATIONS

International Search Report as issued in International Patent Application No. PCT/EP2020/057564, dated Jun. 2, 2020.

* cited by examiner

*Primary Examiner* — David Sample
(74) *Attorney, Agent, or Firm* — Pillsbury Winthrop Shaw Pittman LLP

(57) ABSTRACT

A glass-ceramic article, includes at least one substrate, such as a plate, made of glass-ceramic, the substrate being coated in at least one zone with at least one stack formed 1) of at least one first layer of metal nitride or of semimetal nitride, the first layer exhibiting a thickness of at least 200 nm and a hardness of at least 14 GPa, and 2) of at least one second layer of metal oxide or of semimetal nitride, the second layer exhibiting a thickness of less than 14 nm and exhibiting a coefficient of friction of less than 0.25, the first and second layers being in contact with each other, the second layer being further from the substrate than the first layer.

18 Claims, No Drawings

GLASS-CERAMIC ARTICLE

CROSS-REFERENCE TO RELATED APPLICATIONS

This application is the U.S. National Stage of PCT/EP2020/057564, filed Mar. 19, 2020, which in turn claims priority to French patent application number 1903012, filed Mar. 22, 2019. The content of these applications are incorporated herein by reference in their entireties.

The present invention relates to the field of glass-ceramics. More specifically, it relates to an article, or product, made of glass-ceramic, in particular a glass-ceramic plate intended to act as furniture surface and/or as cooking surface. The term "glass-ceramic article" or "article made of glass-ceramic" is understood to mean an article based on a substrate (such as a plate) made of glass-ceramic material, it being possible for said substrate, if appropriate, to be provided with additional accessories or elements, which are decorative or functional, required for its final use, it being possible for the article to denote both the substrate alone and that provided with additional fittings (for example a cooktop provided with its control panel, with its heating elements, and the like).

A glass-ceramic starts out as a glass, referred to as a precursor glass or parent glass or green-glass, the specific chemical composition of which makes it possible, through suitable heat treatments referred to as ceramization treatments, to bring about controlled crystallization. This specific partially crystalline structure confers unique properties on the glass-ceramic.

There currently exist different types of glass-ceramic plates, each variant being the result of major studies and of numerous tests, given that it is very problematic to modify these plates and/or the process by which they are produced without the risk of having an unfavorable effect on the properties desired: in particular, in order to be able to be used as cooktop, a glass-ceramic plate generally has to exhibit a transmission in the wavelengths of the visible region which is both sufficiently low to conceal at least a portion of the underlying heating elements when turned off and sufficiently high for, depending on the situation (radiant heating, induction heating, and the like), the user to be able to visually detect the heating elements in the operating state for the purpose of safety; it should also exhibit a high transmission in the wavelengths of the infrared region in the case in particular of plates having radiant heating elements. Glass-ceramic plates also have to exhibit a sufficient mechanical strength as required in their field of use. In particular, in order to be used as cooktop in the household electrical appliance field or as surface of a piece of furniture, a glass-ceramic plate has to exhibit a good resistance to pressure, to impacts (support and fall of utensils, and the like), and the like.

Conventionally, glass-ceramic plates are used as cooktops, or they can also be associated with heating elements in other applications, for example in order to form fireplace inserts. Recently, their use has extended to other areas of daily life: glass-ceramic plates can thus be used as furniture surfaces, in particular to form worktops, central islands, consoles, and the like, the surface area which they occupy in these new applications being greater than in the past.

Due to the repeated use of utensils at their surface (such as saucepans for cooktops or various household items for work surfaces), glass-ceramic plates can with use become scratched under the effect of friction with these utensils, indeed also become colored under the effect of friction with metals. As food may adhere to the surface of its plates or these plates may exhibit fingerprint problems, the use of cleaning products, such as more abrasive scouring sponges, can also be an additional source of scratches.

The plates can furthermore exhibit different coatings having a functional and/or decorative purpose, the commonest being enamels, based on glass frit and on pigments, and certain paints resistant to high temperature, for example based on silicone resins. Other coatings also exist, in particular based on layers or on stacks of layers, such as reflective layers in order to obtain contrast effects, but these coatings are generally more expensive and their manufacture is often more problematic. The fact of adding a coating can also complicate the maintenance of the plates, this being because it is possible for the coatings to be detrimentally changed during cleaning or to detrimentally change the optical or mechanical properties of the glass-ceramic.

An ongoing concern in the field of glass-ceramics, whether or not the glass-ceramic is coated, remains to be able to offer a product which is easy to maintain and which retains its appearance and its properties over time.

The present invention has attempted to overcome the above disadvantages of glass-ceramic plates in terms of damage related to the friction of utensils (scratches, coloration by metal friction) by providing an improved glass-ceramic plate, in particular a new glass-ceramic plate, intended to be used with one or more heating elements, such as a cooktop, or intended to act as furniture surface, this plate making it possible to limit the appearance of scratches at its surface in its daily use and also to limit the appearance of colorations due to friction with metal utensils, without, however, harming the other properties desired for its use or harming its esthetic appearance.

This aim is achieved by virtue of the glass-ceramic product developed according to the invention, in which the appearance of scratches or colorations is reduced by the application of a specific coating, said coating being selected according to precise criteria in order to obtain the desired effect. This is because the inventors have demonstrated that the deposition of a stack of layers combining a thick layer of hard material (material, for example, of silicon and/or aluminum nitride type) with a thin covering layer exhibiting a low coefficient of friction on the surface of the glass-ceramic (in particular on the face intended to be in contact with utensils, generally the upper face of the plate) had very favorable effects on the reduction of scratches and on the reduction of coloring effects due to frictional actions with metal.

The present invention thus relates to a new glass-ceramic article, comprising at least one substrate, such as a plate, made of glass-ceramic, said substrate being coated in at least one zone with at least one stack formed:

1) of at least one layer of metal nitride or of semimetal nitride, said layer exhibiting a thickness of at least 200 nm, preferably of at least 700 nm and in particular of at least 1 µm, and a hardness of at least 14 GPa, and
2) of at least one layer of metal oxide or of semimetal nitride, said layer exhibiting a thickness of less than 14 nm, preferably between 1 and 10 nm, and exhibiting a coefficient of friction of less than 0.25, said layers 1 and 2 being in contact with each other, the layer 2 being further from the substrate than the layer 1.

Preferably, the layer 1 also exhibits an elastic modulus of greater than 140 GPa, in particular of greater than 150 GPa.

The hardness H and the elastic modulus E of the layer under consideration are measured using a nanoindenter of DCMII-400 type sold by CSM Instruments, the tip used being a pyramidal diamond tip of 3-sided Berkovich type, according to the standard NF EN ISO 14577, on the layer deposited as a flat tint (with a degree of cover of 100%) on the glass-ceramic.

The coefficient of friction is measured using a CSM microscratch device sold by CSM Instruments, a constant force of 1N being applied to a stainless steel ball with a diameter of 1 cm moving over a distance of 2 cm at constant speed, thirty passes (15 to-and-fro motions) being carried out in all, the coefficient of friction being the ratio of the tangential force to the normal force measured by sensors. The present invention has demonstrated that the selection of layers carried out makes possible a synergy between said layers defining the stack in order to obtain the desired properties. In particular, the application of a so-called "hard" layer (for example with a greater hardness than the glass-ceramic, which is of the order of 7.5 GPa), alone, limits scratches but can abrade the bottom of utensils made of metal and generate, if appropriate, metal marks, while the application of a simple lubricating layer limits metal deposits but this layer is scratchable, these scratches being visible if their depth exceeds the thickness of the layer. Combined and with the selection parameters given according to the invention, it turns out that these two types of layers in the present invention limit scratches and metal deposits, in particular scratches made at the surface of the very thin lubricating layer selected combined with the hard layer selected especially not being visible to the naked eye. The stack deposited according to the invention thus increases the durability of the plates by making it possible both to considerably reduce the appearance of scratches and to limit the appearance of colorations due to the frictional actions of metal utensils (such as saucepans). The product according to the invention also exhibits good adhesion of the stack to the glass-ceramic substrate (without the need for prior treatment of the support and/or the use of an adhesion promoter, of a tie layer or of a primer) or to any adjacent layer possibly present on the substrate. This stack does not in particular show any delamination after a thermal shock (for example in the vicinity of 600° C.), and withstands high temperatures. The coated substrate exhibits good thermal stability and can be used with different heating sources (induction, radiant, and the like). Moreover, the stack does not mechanically weaken the glass-ceramic substrate.

Preferably, the layer 1 of the stack is a layer of or based on silicon and/or aluminum and/or zirconium and/or titanium nitride (that is to say, silicon nitride or aluminum nitride or zirconium nitride or titanium nitride or aluminum silicon nitride or silicon zirconium nitride or silicon zirconium nitride doped with aluminum, and the like).

The layer 2 defined above advantageously exhibits lubricating properties and contributes to a particularly significant reduction in the sensitivity to scratching and to coloring of the stack. Preferably, this layer 2 is a layer of or based on: titanium oxide or titanium zirconium oxide, or boron nitride, or zirconium oxide, it being possible for one or the other of these layers also to be doped.

Each layer of metal nitride or oxide or of semimetal nitride mentioned above is advantageously essentially (to at least 85% by weight) formed, indeed even solely (with the exception of the impurities possibly present, which in this case do not represent more than 5% of the layer) formed, of nitrogen (for the nitrides) or of oxygen (for the oxides), and of the metal(s) or semimetal(s) mentioned in its name. The designation "metal or semimetal nitride" or "metal oxide" does not exclude, if appropriate, the presence of other chemical elements than those which are mentioned in the name of the nitride or of the oxide concerned, nor prejudge the actual stoichiometry of the layer. Each layer can in particular be doped or comprise a small amount of one or more chemical elements added as dopants in the targets used, with the aim of increasing their electron conductivity and of thus facilitating the deposition by the magnetron cathode sputtering technique. The content of dopant(s) or of other chemical components or elements than those mentioned in the layer concerned is, however, less than 15% by weight (in the target and in the layer), preferably less than 10% by weight, indeed even zero. The layer 1 of the abovementioned stack is a thick layer, in particular thicker than the thin layers usually deposited by magnetron (the (physical) thickness of which does not exceed of the order of 100 nm), the (physical) thickness of said layer being at least 200 nm, preferably at least 700 nm and particularly advantageously at least 1000 nm (1 µm), and being able to range in particular up to 5000 nm, and preferably not exceeding 2500 nm, indeed even not exceeding 2000 nm, especially being between 1000 and 1500 nm. Conversely, the layer 2 exhibits a low thickness, of less than 14 nm, in particular of less than or equal to 10 nm, and of greater than or equal to 1 nm, preferably of between 2 and 10 nm, in particular of the order of 4-8 nm.

Advantageously, the layer 1 exhibits a hardness H of greater than 14 GPa and in particular of greater than 20 GPa, indeed even of greater than 30 GPa. This layer also exhibits a modulus of elasticity E of greater than 140 GPa, in particular of greater than 150 GPa, indeed even of 200 GPa or more.

In the present invention, a single stack of layers 1 and 2 is in particular sufficient to obtain the improvements according to the invention. The term "layer" is understood to mean a uniform layer of one and the same material, even if, for example, said layer has been obtained in several passes starting from one and the same target. The coating including the stack selected according to the invention can thus advantageously contain only a single stack as mentioned above, indeed even contain only said stack.

It is, however, not excluded to use a stack of layers including the abovementioned stack and one or more other layers on either side of the stack (or, in other words, one or more other layers on or under the abovementioned stack), the coating (or the total stack) formed by these layers increasing the durability of the plates by the presence of the stack according to the invention.

The coating including at least the stack according to the invention can, for example, comprise, between the substrate and said stack, at least one layer, or a stack of layers, which influences, for example, the appearance in reflection of the plate or which can be used to block a possible migration of ions or which can act as adhesion layer, and the like, such as a layer of silicon oxynitride or of silicon nitride or also an adhesion layer made of silica or $SiO_x$, the (physical) thickness of this or these layers preferably being within a range extending from 1 to 30 nm. In an advantageous embodiment, the stack according to the invention is deposited directly in contact with the substrate made of glass-ceramic (or, in other words, in the product, is (directly) in contact with said glass-ceramic), in at least one of its faces (preferably on its face intended to be turned toward the user in the position of use, or upper or external face, the other (lower or internal) face being generally hidden in the position of use), without other underlying coating layer.

In another alternative or cumulative embodiment, the stack according to the invention is in contact with the ambient atmosphere (in other words, there are no other layers or coating above, this stack being found on the atmosphere side or being furthest from the glass-ceramic, if there are other layers).

The total thickness of the coating (including the stack and optional other layers) preferentially does not exceed 5000 nm.

The stack can cover only a part of the substrate, or an entire face (in particular a main face), for example the upper face in the position of use, which is particularly subject to cleaning. In particular, the substrate made of glass-ceramic is provided on its upper or external face with said stack according to the invention, alone or forming part of a coating including other layer(s).

The glass-ceramic article (or product) according to the invention is in particular a cooktop, or a cooking device or apparatus, or any furniture article incorporating (or comprising, or formed of) at least one substrate made of glass-ceramic (material) (the substrate being most commonly in the form of a plate, coming to be incorporated or to be assembled in the piece of furniture and/or combined with other elements in order to form the piece of furniture), it being possible for said substrate, if appropriate, to exhibit zones having a display character (in combination, for example, with light-emitting sources) or decorated zones or to be combined with heating elements. In its commonest application, the article according to the invention is intended to act as cooktop, this plate generally being intended to be incorporated in a cooking surface or kitchen range also comprising heating elements, for example radiant or halogen heat sources or induction heating elements. In another advantageous application, the article according to the invention is a worktop made of glass-ceramic or a central island, if appropriate with different displays and without necessarily cooking zones, indeed even a console-type piece of furniture (the substrate forming, for example, the upper part), and the like.

The substrate (or the article according to the invention itself, if it is formed only of the substrate) is generally (in the form of) a plate, intended in particular to be used with, especially to cover or receive, at least one light source and/or one heating element or intended to act as furniture surface. This substrate (or respectively this plate) is generally of geometric shape, in particular rectangular, indeed even square, indeed even circular or oval, and the like, shape, and generally exhibits a face turned toward the user in the position of use (or visible or external face, generally the upper face in the position of use), another face which is generally hidden, for example in a furniture framework or casing, in the position of use (or internal face, generally the lower face in the position of use), and an edge face (or edge or thickness). The upper or external face is generally flat and smooth but may also locally exhibit at least one protruding zone and/or at least one recessed zone and/or at least one opening and/or beveled edges, and the like, these variations in shape constituting in particular continuous variations in the plate. The lower or internal face can also be flat and smooth or provided with pins. The thickness of the glass-ceramic substrate is generally at least 2 mm, in particular at least 2.5 mm, and is advantageously less than 15 mm, especially is of the order of 3 to 15 mm, in particular of the order of 3 to 8 mm or of the order of 3 to 6 mm. The substrate is preferably a flat or virtually flat plate (especially with a deflection of less than 0.1% from the diagonal of the plate, and preferably of the order of zero).

The substrate can be based on any glass-ceramic, this substrate advantageously exhibiting a glass or virtually zero CTE, especially of less than (in absolute value) $30 \cdot 10^{-7}$ K$^{-1}$ between 20 and 700° C., in particular of less than $15 \cdot 10^{-7}$ K$^{-1}$, indeed even of less than $5 \cdot 10^{-7}$ K$^{-1}$, between 20 and 700° C.

The invention is particularly advantageous for substrates of dark appearance where the scratches are more easily seen, these substrates having low transmissions and weak scatterings, and being in particular based on any glass-ceramic having, intrinsically, a light transmission TL of less than 40%, especially of less than 5%, in particular from 0.2% to 2%, for glass-ceramics up to 6 mm in thickness, and an optical transmission (determined in known way by taking the ratio of the transmitted intensity to the incident intensity at a given wavelength) between 0.5% and 3% for a wavelength of 625 nm within the visible region. The term "intrinsically" is understood to mean that the substrate has such a transmission in itself, without the presence of any one coating. The optical measurements are carried out according to the standard EN 410. In particular, the light transmission TL is measured according to the standard EN 410 using illuminant D65 and is the total transmission (in particular integrated over the visible region and weighted by the curve of sensitivity of the human eye), taking into account both direct transmission and possible diffuse transmission, the measurement being carried out, for example, using a spectrophotometer equipped with an integrating sphere (in particular with the spectrophotometer sold by Perkin-Elmer under the reference Lambda 950).

In particular, the substrate is a substrate of black or brown appearance, making it possible, in combination with light sources placed below, to display light zones or decorations, while masking possible underlying elements. It can in particular be based on a black glass-ceramic comprising crystals of β-quartz structure within a residual vitreous phase, the absolute value of its expansion coefficient advantageously being less than or equal to $15 \cdot 10^{-7}$K$^{-1}$, indeed even $5 \cdot 10^{-7}$K$^{-1}$, such as the glass-ceramic of the plates sold under the KeraBlack+ name by Eurokera. It can in particular be a glass-ceramic with a composition as described in the patent application EP 0 437 228 or U.S. Pat. No. 5,070,045 or FR 2 657 079, or a glass-ceramic refined with tin exhibiting a content of arsenic oxides preferentially of less than 0.1%, as described, for example, in the patent application WO2012/156444, or also a glass-ceramic refined with sulfide(s), as described in the patent application WO2008053110, and the like.

The present invention can also be applied in the case where the substrate is lighter, for example for a transparent substrate, if appropriate coated with an opacifying coating, generally made of paint, on its lower face, such as a plate sold under the Keralite® name by Eurokera.

According to the invention, the glass-ceramic substrate under consideration is coated in one or more zones (or at least one zone of said substrate is coated), more particularly at the surface, on at least a part of a face, advantageously on at least a part of the face turned toward the user in the position of use and/or requiring a reduction in the visibility of scratches and colorations, generally the upper or external face in the position of use, and in particular is coated over the whole of said face. It is coated with at least (or by at least) the stack defined according to the invention or a coating comprising said stack.

The substrate according to the invention can, if appropriate, be coated with other coatings or layers having a functional effect (anti-overflow layer, opacifying layer, and the like) and/or decorative effect, in particular which are localized, such as usual patterns based on enamels (for example, in the upper face, in order to form logos or simple patterns)

or a layer of opacifying paint on the lower face of the substrate, and the like. In particular, the substrate can be coated with at least one layer of enamel and/or of paint, in particular of luster type, localized or not, at least in part or entirely on (in particular atmosphere side) or under (in particular in contact with the substrate) the stack according to the invention, it being possible for said layer of enamel or paint/luster to be in contact with the stack according to the invention. The term "paint of luster type" is understood in particular to mean a paint formed of metal oxides and devoid of pigments, this paint or luster exhibiting in particular a refractive index of greater than 1.54. The thickness of such a layer of paint can in particular be between 10 and 100 nm.

The article according to the invention can additionally comprise, associated or combined with the substrate, one or more light sources and/or one or more heating elements (such as one or more radiant or halogen elements and/or one or more atmospheric gas burners and/or one or more induction heating means), generally placed in the lower face of the substrate. The source or sources can be incorporated in or coupled to one or more display-type structure(s), to a touch-sensitive digital-display electronic control panel, and the like, and are advantageously formed by light-emitting diodes, which are more or less spread out, optionally associated with one or more optical guides.

The article can also be provided with (or associated with) additional functional element(s) (frame, connector(s), cable(s), control element(s)), and the like).

The invention has thus made possible the development of a glass-ceramic product having a surface more resistant to scratches and colorations at the desired locations (for example over the whole of a face or over only a few zones, for example zones more exposed to handling operations or scratches, such as heating zones), at the same time as the product retains a mechanical strength as required for various uses (in particular for its use as a cooktop). The solution according to the present invention thus makes it possible to obtain, in a simple and economical manner, without complex operation (it being possible for the layer to be deposited by deposition techniques under reduced pressure, such as cathode sputtering, as indicated later), in a durable manner and with high flexibility, zones of greater resistance to scratches and colorations in any desired zone of the product, this being the case even when these zones are intended to be subjected to high temperatures. The article according to the invention exhibits in particular a good thermal resistance compatible with the use of various types of heating procedures, and does not present maintenance problems. The product according to the invention especially does not undergo thermal degradation at temperatures of greater than 400° C. which can be achieved in particular in applications such as the use as cooktops.

The present invention also relates to a process for the manufacture of the glass-ceramic article according to the invention, starting from a substrate made of glass-ceramic, in which there is deposited (or applied), on (or to) at least one zone of said substrate:

1) at least one layer of metal nitride or of semimetal nitride, said layer exhibiting a thickness of at least 200 nm, preferably of at least 700 nm and in particular of at least 1 µm, and a hardness of at least 14 GPa, then
2) at least one layer of metal oxide or of semimetal nitride, said layer exhibiting a thickness of less than 14 nm, preferably between 1 and 10 nm, and exhibiting a coefficient of friction of less than 0.25, said layers 1 and 2 being in contact with each other.

The application or deposition of each layer of the stack according to the invention can be carried out by any appropriate and rapid technique making it possible in particular to produce uniform layers or flat tints of layers of this type, in particular, for the layer 1 especially, indeed even for the layer 2, by a process for deposition under reduced pressure, such as cathode sputtering, in particular magnetron-enhanced, or also chemical vapor deposition (CVD), if appropriate plasma-enhanced (PECVD). The application of the layer 1 in particular is preferably carried out by cathode sputtering, in particular magnetron-enhanced, this deposition being carried out with a good yield and a good deposition rate. The layer 2 can also be deposited by cathode sputtering or can also be deposited by the liquid route, for example by the sol-gel route, screen printing, centrifugal coating (spin coating), dipping (deep coating), and the like. The other possible layers of oxides or nitrides of the same coating can also be deposited, if appropriate, by the same method(s) of deposition as above (the deposits being in particular successive), the other types of layers optionally present (enamel, luster) on the substrate being deposited independently by any appropriate usual technique (such as screen printing or inkjet printing for enamels).

The cathode sputtering preferentially used is in particular of the AC (alternating current) or DC (direct current) type or in a particularly preferred way of pulsed DC type, according to the type of generator employed to polarize the cathode. The targets are, for example, planar or tubular (in the form of rotating tubes).

The deposition by cathode sputtering takes place in particular using an appropriate target in an atmosphere consisting of plasmagen gas (generally argon) and of nitrogen (for nitrides) and/or of oxygen (for oxides), if appropriate doped (for example with aluminum or boron) in order to increase its electron conductivity. The active entities of the plasma, by bombarding the target, tear off said elements, which are deposited on the substrate with the formation of the desired layer and/or react with the gas contained in the plasma in order to form said layer. Advantageously, the atmosphere (formed of plasmagen gas) during the deposition, in the chamber where the deposition in question is taking place, comprises less than 1% by volume of oxygen (which may be residual in the chamber or optionally supplied), indeed even is devoid of oxygen, for the layers based on nitrides. Preferably, for said layers based on nitrides, the oxygen flow rate during the deposition of the layer is zero, or in other words there is no oxygen intentionally introduced into the sputtering atmosphere of said target.

The pressure of deposition (or during the deposition) of each layer concerned by cathode sputtering is in particular at most 2.5 µbar, preferably is within a range extending from 1.5 µbar to 2.3 µbar. The term "pressure of deposition" is understood to mean the pressure prevailing in the chamber where the deposition of this layer is carried out. The application of the pressure selected in the deposition chamber(s) concerned contributes to obtaining a layer exhibiting a good mechanical and abrasion resistance. The power of deposition of the layers is also preferably within a range extending from 2 to 10 $W/cm^2$ of target, during the deposition of said layers, and the rate of forward progression of the substrate under the various targets is preferentially within a range extending from 0.1 to 3 m/min.

The deposition is carried out in particular on the preceramized and unheated substrate. According to a particularly preferred embodiment, the substrate is subjected to a heat treatment after deposition of the layer 1 (and before the deposition of the layer 2) or after deposition of the stack, in particular to a tempering treatment or an annealing, at a temperature for example of the order of 750° C. to 900° C., for approximately ten minutes, this treatment making it possible to relax the stresses and to further increase the hardness of the layer 1 of the stack according to the invention.

For the record, the manufacture of glass-ceramic plates is generally carried out as follows: the glass with the composition chosen in order to form the glass-ceramic is melted in a melting furnace, the molten glass is then rolled to give a standard ribbon or sheet by passing the molten glass between rolling rolls and the glass ribbon is cut to the desired dimensions. The plates, thus cut, are subsequently ceramized in a way known per se, the ceramization consisting in firing the plates according to the thermal profile chosen in order to convert the glass into the polycrystalline material known as "glass-ceramic", the coefficient of expansion of which is zero or virtually zero and which withstands a thermal shock which can in particular range up to 700° C. The ceramization generally comprises a stage in which the temperature is gradually raised up to the nucleation range, a stage of passing through the nucleation interval (for example between 650° C. and 830° C.) in several minutes (for example between 5 and 60 minutes), a further rise in the temperature in order to make possible the growth of the crystals (ceramization in an interval ranging, for example, from 850° C. to 1000° C.), with maintenance of the temperature of the ceramization stationary phase for several minutes (for example from 5 to 30 minutes), and then a rapid cooling down to ambient temperature.

If appropriate, the process also comprises a cutting operation (generally before ceramization), for example using a jet of water, mechanical marking using a cutting wheel, and the like, followed by a shaping operation (grinding, beveling, and the like).

The following examples illustrate the present invention without limiting it.

The hardness H and the elastic modulus E, when they are mentioned, were measured using a nanoindenter of DCMII-400 type, the tip used being a pyramidal diamond tip of Berkovich type (3 sides) according to the standard NF EN ISO 14577.

The abrasion resistance of the different samples was measured using an abrasive paper of P800 type sold by Norton and incorporating silicon carbide grains with a mean equivalent diameter of 20 µm, by making a paper to-and-fro motion over the surface of the glass-ceramic (bare or coated) over a distance of 3.81 cm at a rate of 15 to-and-fro motions per minute and an applied pressure of 5 N/cm². The measurements in terms of number of scratches were made from photos taken by illuminating the samples using 3-color light-emitting diodes in a light box, image processing (binarized in black and white and making it possible to reveal the scratches in black pixels and the unscratched part in white pixels) making it possible to analyze the photographs taken. A "scratchability index" was evaluated giving an index x corresponding to the number y of black pixels recorded on an image composed of 132 000 pixels, divided by 10 000 (x=y/10 000, the index x being, for example, 1 when there are 10 000 black pixels, 2 when there are 20 000 black pixels, and the like).

The coefficient of friction was also measured using a CSM microscratch device sold by CSM Instruments. A constant force of 1N was applied to a stainless steel ball with a diameter of 1 cm moving over a distance of 2 cm at constant speed, thirty passes being carried out in all. The coefficient of friction measured was the ratio of the tangential force applied to the normal force applied, which forces are measured by sensors.

The samples were also subjected to a metal friction test on a reference 5750 Linear Abraser device (sold by Taber) with a flat stainless steel wiper, the arm carrying the wiper travelling 3.81 cm at a rate of 60 cycles per minute, with an application force of 2 MPa. The test consisted in carrying out to-and-fro motions and in determining the number of cycles from which a metal deposit was observed at the surface, this test making it possible to simulate the movement of a saucepan at the surface of a glass-ceramic, the movements of saucepans generating two types of damage: scratches in the form of metal deposits resulting from the saucepan, and plastic deformation or cracks or abrasions of the glass-ceramic.

In these examples, small 20 cm by 20 cm plates of the same substrate formed of a translucent black glass-ceramic, sold under the reference KeraBlack+ by Eurokera, were used, these small plates exhibiting a smooth upper face and a lower face provided with pins and a thickness of 4 mm.

The bare small glass-ceramic plates had a hardness of 7.5 GPa, obtained a scratchability index of 4 and a coefficient of friction (glass-ceramic/metal contact) of 0.3. Furthermore, on the bare glass-ceramic, the wiper according to the friction test on the reference 5750 Linear Abraser device scratched the surface in less than about twenty cycles.

On these small plates, different layers were deposited as follows, each of these layers being deposited by pulsed DC magnetron-enhanced cathode sputtering at low pressure of the order of 2 µbar, with a power density per unit area of the target of less than 6 W/cm²:

a stack according to the invention, comprising a thick first layer 1, with a thickness of 1200 nm and with a hardness of 20 GPa and with an elastic modulus of 200 GPa, of silicon nitride, and a second layer, with a thickness of 5 nm, of $TiO_x$ with a coefficient of friction of 0.17, was deposited on a first series of small plates.

The small plates thus coated had a hardness of 20 GPa, obtained a scratchability index of less than 0.7 and a coefficient of friction of 0.2. Furthermore, on the glass-ceramic thus coated, the wiper according to the friction test on the reference 5750 Linear Abraser device scratched the surface well above about a hundred cycles.

a stack according to the invention, comprising a thick first layer 1, with a thickness of 1200 nm and with a hardness of 20 GPa and with an elastic modulus of 200 GPa, of silicon nitride, and a second layer, with a thickness of 5 nm, of $TiZrO_x$ with a coefficient of friction of 0.15, was deposited on a second series of small plates.

The small plates thus coated had a hardness of 20 GPa, obtained a scratchability index of less than 0.4 and a coefficient of friction of 0.18. Furthermore, on the glass-ceramic thus coated, the wiper according to the friction test on the reference 5750 Linear Abraser device scratched the surface well above about a hundred cycles.

a stack according to the invention, comprising a thick first layer 1, with a thickness of 1200 nm and with a hardness of 14.5 GPa and with an elastic modulus of 140 GPa, of $Si_xZr_yN_z$ with an atomic ratio of Zr to the sum Si+Zr, y/(x+y), of 32%, and a second layer, with a thickness of 5 nm, of $TiO_x$ or of $TiZrO_x$ with a coefficient of friction of 0.17 and 0.15 respectively, was deposited on a third series of small plates.

The small plates thus coated had a hardness of 20 GPa, obtained a scratchability index of less than 1 and a coefficient of friction of 0.15 to 0.18. Furthermore, on the glass-ceramic thus coated, the wiper according to the friction test on the reference 5750 Linear Abraser device scratched the surface well above about a hundred cycles.

By way of comparison:

just one thick layer, with a thickness of 1200 nm and with a hardness of 20 GPa and with an elastic modulus of 200 GPa, of silicon nitride was deposited on a fourth series of small plates.

The small plates thus coated had a hardness of 20 GPa, obtained a scratchability index of less than 0.5 but a coefficient of friction of 0.4 (i.e., higher than the bare glass-ceramic). Furthermore, on the glass-ceramic thus coated, the wiper according to the friction test on the reference 5750 Linear Abraser device was abraded in thirty cycles by the silicon nitride layer.

just one thin layer, with a thickness of 5 nm, of $TiO_x$ or $TiZrO_x$ with a coefficient of friction of 0.17 and 0.15 respectively was deposited on a fifth series of small plates.

The plates thus coated had a hardness of 7.5 GPa, obtained a scratchability index of greater than 3 and a coefficient of friction of 0.18; in addition, on the glass-ceramic thus coated, the wiper according to the friction test on the reference 5750 Linear Abraser device scratched the surface in less than about twenty cycles.

a stack, comprising a thick first layer 1, with a thickness of 1200 nm and with a hardness of 20 GPa and with an elastic modulus of 200 GPa, of silicon nitride, and a second layer, with a thickness of 15 nm (greater than the limiting thickness of the second layer according to the invention), of $TiZrO_x$ with a coefficient of friction of 0.15, was deposited on a sixth series of small plates.

The small plates thus coated had a hardness of 20 GPa, obtained a scratchability index rising again (in comparison with the preceding stacks defined according to the invention, which did not exceed 1) up to approximately 2 (i.e., a much lower resistance to scratches) and a coefficient of friction of 0.15.

The preceding examples show that the stack according to the invention makes it possible in particular to obtain both a considerable reduction in visible scratches and considerably limits the appearance of colorations due to the frictional actions of metal utensils.

Various cleaning tests on surfaces carrying traces of coffee, milk, vinegar, burnt tomato sauce, under cold and hot conditions, with different household products (such as the VitroClen brand products from Reckitt Benckiser or an induction and glass-ceramic cleaning product from Kiraviv) have also demonstrated that the glass-ceramic coated with the layer selected according to the invention was easy to clean and that the layer did not degrade chemically. Likewise, this layer did not delaminate after thermal shocks at 620° C., nor did it show degradation after 100 h at 580° C.

The articles according to the invention can in particular be used with advantage to produce a novel range of cooktops for kitchen ranges or cooking surfaces or a novel range of work tables, consoles, credenzas, central islands, and the like.

The invention claimed is:

1. A glass-ceramic article, comprising at least one substrate made of glass-ceramic, said substrate being coated in at least one zone with at least one stack formed:
   1) of at least one first layer of silicon and/or zirconium and/or titanium nitride, said first layer exhibiting a thickness of at least 200 nm and a hardness of at least 14 GPa, and
   2) of at least one second layer of, or based on, titanium oxide, or titanium zirconium oxide, or boron nitride, or zirconium oxide, the second layer being optionally doped, said second layer exhibiting a thickness of between 1 and 10 nm and exhibiting a coefficient of friction of less than 0.25,
   said first and second layers being in contact with each other, the second layer being further from the substrate than the first layer.

2. The glass-ceramic article as claimed in claim 1, wherein said first layer exhibits a modulus of elasticity E of greater than 140 GPa.

3. The glass-ceramic article as claimed in claim 2, wherein the modulus of elasticity E of said first layer is greater than 150 GPa.

4. The glass-ceramic article as claimed in claim 1, wherein the coating including said stack contains only a single stack of the first and second layers.

5. The glass-ceramic article as claimed in claim 4, wherein the coating contains only said stack.

6. The glass-ceramic article as claimed in claim 1, wherein the substrate is coated with at least one layer of enamel or of paint on or under said stack.

7. The glass-ceramic article as claimed in claim 1, wherein said stack is directly in contact with said substrate made of glass-ceramic, without other underlying coating layer.

8. The glass-ceramic article as claimed in claim 1, wherein said stack is in contact with the ambient atmosphere.

9. The glass-ceramic article as claimed in claim 1, wherein the glass-ceramic article is a cooking device additionally comprising one or more heating elements.

10. The glass-ceramic article as claimed in claim 1, wherein the substrate is a plate.

11. The glass-ceramic article as claimed in claim 1, wherein the thickness of the first layer is of at least 700 nm.

12. A process for the manufacture of an article made of glass-ceramic as claimed in claim 1, said article comprising at least one substrate made of glass-ceramic, in which there is deposited, on at least one zone of said substrate:
   1) at least one first layer of silicon and/or zirconium and/or titanium nitride, said first layer exhibiting a thickness of at least 200 nm and a hardness of at least 14 GPa, then
   2) at least one second layer of, or based on, titanium oxide, or titanium zirconium oxide, or boron nitride, or zirconium oxide, the second layer being optionally doped, said second layer exhibiting a thickness of between 1 and 10 nm and exhibiting a coefficient of friction of less than 0.25, said first and second layers being in contact with each other.

13. The process as claimed in claim 12, wherein said substrate is subjected to a tempering treatment or to an annealing at a temperature of 750° C. to 900° C. after deposition of the first layer or after deposition of the stack.

14. The process as claimed in claim 12, wherein the deposition of the first layer is carried out by cathode sputtering and the deposition of the second layer is carried out by cathode sputtering or by the liquid route.

15. The process as claimed in claim 12, wherein the thickness of the first layer is of at least 700 nm.

16. The process as claimed in claim 12, wherein the thickness of the first layer is of at least 1 μm.

17. The process as claimed in claim 14, wherein the deposition of the first layer is carried out by magnetron-enhanced sputtering.

18. The process as claimed in claim 14, wherein the cathode sputtering is a pulsed DC cathode sputtering.

\* \* \* \* \*